United States Patent [19]

Rasmussen

[11] Patent Number: 4,832,588
[45] Date of Patent: May 23, 1989

[54] CROSSHEAD EXTRUDERS

[75] Inventor: Viggo Rasmussen, Horsens, Denmark

[73] Assignee: Viradan A/S, Horsens, Denmark

[21] Appl. No.: 9,294

[22] Filed: Jan. 30, 1987

[30] Foreign Application Priority Data

Jan. 30, 1986 [DK] Denmark ................................ 450/86

[51] Int. Cl.⁴ ............................................. B29C 47/28
[52] U.S. Cl. ..................................... 425/114; 264/172;
264/173; 264/209.2; 425/192 R; 425/381;
425/382.3
[58] Field of Search ..................... 264/174, 172, 209.2,
264/209.6, 173; 425/113, 114, 131.1, 381, 133.1,
376 B, 380, 205, 192 R, 382.3

[56] References Cited

U.S. PATENT DOCUMENTS

| 291,849 | 1/1884 | Howson | 264/172 |
| 2,053,307 | 9/1936 | Wilson | 264/173 |
| 2,611,941 | 9/1952 | Leitl | 425/380 |
| 3,979,488 | 9/1976 | Greenhalgh et al. | 425/205 |

FOREIGN PATENT DOCUMENTS

| 41-16074 | 5/1963 | Japan | 425/113 |
| 57-06739 | 1/1982 | Japan | 425/133.1 |
| 60-242031 | 12/1985 | Japan | 425/113 |
| 808283 | 2/1959 | United Kingdom | 425/113 |
| 1312074 | 4/1973 | United Kingdom | 425/131.1 |
| 2160815A | 1/1986 | United Kingdom | 425/113 |

Primary Examiner—Jeffery Thurlow
Attorney, Agent, or Firm—Antonelli, Terry & Wands

[57] ABSTRACT

A crosshead extruder having an extruder housing with a throughlet passage for cylindrical workpieces to be coated with a highly viscid material such as unvulcanized rubber. The crosshead extruder includes an extruder nozzle for defining the thickness of such coating, a side inlet for supply of a pressurized coating material to the extruder housing, and an interior power driven worm member for receiving the pressurized inlet material and conveying the material around the workpiece passage and forwardly towards the extruder nozzle. The coating material is present at the extruder nozzle all the way around the workpieces even when the workpieces are of a large diameter. For counteracting a rotational movement of the coating material out through the extruder nozzle the worm member has a protruding front end core porton which is non-rotatably by being mounted on a holding pipe which projects rearwardly through the central passage of the worm member and beyond the rear end thereof, where the holding tube is non-rotatably anchored to a chassis of the crosshead extruder.

4 Claims, 1 Drawing Sheet

CROSSHEAD EXTRUDERS

A method of providing cylindrical workpieces with a coating of a highly viscid material and a cross head extruder for use therewith.

BACKGROUND OF THE INVENTION

The present invention relates to a method of applying, by a crosshead extruder, an outer layer of an unvulcanized rubber mass or a similar coating material onto a cylindrical workpiece, e.g. for the production of stabilized rubber cylinders for use in the printing industry. The term "crosshead" refers to an arrangement whereby an elongate carrier tube is conveyed through a "crosshead" extruder device which receives the coating material under a high pressure through a side inlet thereof and compacts this material on and around the carrier tube workpiece as the latter leaves the crosshead through an extruder nozzle adjacent the front end of the crosshead. Thus, inside the crosshead the crosswise introduced coating material is distributed around the cylindrical workpiece and is forced into contact therewith adjacent the outlet nozzle of the device, whereby the workpiece may leave the nozzle coated with a surface layer of any desirable thickness as determined by the diameter of the extruder nozzle opening.

However, a highly viscid rubber mass is difficult to handle, and it has been found that these simple crossheads are not usable for producing coated products when the diameter of the articles to be coated exceeds some 50 mm. One problem is that the rubber is not well distributed around the workpiece tube, and it has been proposed in, for example, GB-A-1,082,538, to effect a better distribution by incorporating in the crosshead a stationary worm structure which will guide the rubber around the workpiece, but still such a system will be usable for small diameters only, as it will be practically impossible to force the rubber through a worm groove of any considerable length.

In connection with less viscid materials it is known to effect an extrusion by a crosshead having a rotating worm with a central passage for the throughlet of the articles to be coated, whereby the worm operates to draw the material from a supply hopper and deliver it under pressure adjacent the nozzle end of the crosshead. Such an operation will not be applicable for highly viscid materials, not only because they cannot just be drawn from a hopper, but also because the rotating discharge end of the work will cause the material to be almost threaded onto the article to be coated, and normally the quality of such an extrusion will be unacceptable.

Generally, in order to obtain a good result the space just inside the extruder nozzle and around the article to be coated should be filled by the viscid material under a high pressure and with an entirely even distribution of the material. In a crosshead structure the correct filling of the space can be promoted by an increased inlet pressure of the material or an increased axial distance between the material inlet port and the extruder nozzle, but such measures will be usable to a limited extent only, because for larger dimensions the required movements of the material will be connected not only with extremely high pressure requirements, but also with the development of a considerable compression heat and frictional heat in the material. This, of course, is acceptable only to a certain extent, due to the risk of the rubber starting to be vulcanized in an uncontrolled manner.

In practice, therefore, despite many prior proposals for crosshead extruders of different kinds, it is customary to produce rubber coated cylinders of diameters larger than some 5–10 cm by entirely different and rather difficult methods, primarily by a rolling on of thin rolled rubber sheets, this with the well known risk of air blisters being trapped between the sheets in an unacceptable manner.

It is the purpose of this invention to provide a method whereby even large diameter workpieces may be coated by a highly viscid material such as rubber, based on the use of a crosshead extruder.

According to the invention the material is supplied under a high pressure to a crosshead extruder having a centrally apertured rotatable worm, which is operable to convey the material towards the extruder nozzle past a cylindrical worm core head, which projects towards the extruder nozzle from the front end of the core of the worm and is rotatably connected with the worm, the material being fed to the extruder nozzle by powered rotation of the worm while the worm core head is held substantially non-rotating relative to the extruder nozzle. The invention is based on the recognition that while a power driven worm is not by itself, in the present context, a usable means for picking up the material and building up a high material pressure adjacent the extruder nozzle, it will nevertheless be a perfect means for transporting and distributing an already pressurized material, which is forced into the crosshead. The material will be moved by the worm due to the powered rotation thereof, this requiring a much smaller inlet pressure on the material and giving rise to a much smaller friction heat generation than if the transfer of the material should take place through fixed channel means. Of course, the worm may well contribute to a high material pressure adjacent the extruder nozzle, but the more important aspect of its use is that it does away with the discussed limitation as to the length of the transfer path of the highly viscid material, such that it will allow for the production of coated articles practically regardless of their size.

As already mentioned, the use of a rotating worm, regardless of the more detailed purpose thereof, is liable to destroy the desired uniformity of the coating, because it will tend to "thread38 the highly viscid material out through the extruder nozzle. For this reason it is very important that the worm core head is arranged in a generally non-rotating manner, as this will brake the threading of the material and thus eliminate the associated drawback of the use of a worm.

The invention also comprises a novel crosshead for effecting the disclosed method. The required supply of the material to the crosshead at high pressure can be effected by known means, just as for the supply to ordinary crossheads for highly viscid materials, but the requirement as to the non-rotating worm core head will involve a novel construction of the crosshead, even compared to crossheads for less viscid materials, in which the use of a rotating worm is known for the picking up of the material from a hopper and for the building up of the required pressure at the extruder nozzle. In crossheads for such materials there is no specific problem with respect to the uniformity of the material as applied as a coating onto the articles to be coated, because the discussed threading-effect is very little pronounced, if existing at all, so for this reason there is no need to arrange for any non-rotating worm core head.

It should be mentioned, however, that it has nevertheless been proposed to provide a crosshead of the latter type with a non-rotating worm core head, though for an entirely different purpose. In this connection, German Patent Specification No. 545.937, proposes a presumably non-rotating worm core head which is held in a centered position by radial adjustment screws. The purpose of this arrangement is to make possible a fine centering of the workpiece inside the extruder nozzle as achievable by an adjustment of the radial screws. However, if used in the present connection, with rubber or a similar highly viscid material being moved from the end of the worm towards the extrusion nozzle the radial screws might give rise to a shadow effect in the material, which could not thereafter flow together into a fully homogenous mass adjacent the extruder nozzle. This is a theoretical consideration, because the first result would be that the radial adjustment screws would break as matches when subjected to the pressure of the highly viscid material. If they were made strong enough to resist this pressure they would be much thicker, and their shadowing effect would be still more pronounced, i.e. such an arrangement is simply not usable in connection with the present invention.

In the crosshead according to the invention the worm core head as protruding from the delivery end of the rotating worm is anchored against rotation in being connected with a holding pipe, which extends rearwardly through the central passage of the worm, closely inside the inner wall thereof and rearwardly beyond the rear end of the worm, the holding pipe at its rear end, outside the worm, being non-rotatably anchored to the housing of the crosshead. Hereby the worm core head is stabilized against rotation without having any portions protruding into the moving path of the viscid material, while still allowing cylindrical workpieces to be moved through the crosshead in a centered position therein as determined by the inner passage of the holding pipe.

Of course, the interior diameter of the holding pipe should be adpated to the size of the workpieces to be handled, or be provided with a lining tube so adapted, such that an exact centering of the workpieces will be possible.

It is a very important possibility that, in the crosshead according to the invention, the worm core head or nozzle core may be axially adjustable from the rear end of the holding tube. The axial distance between the nozzle core and the extruder nozzle may be rather critical for a good result, and both for different diameters and different coating materials such an axial adjustability will be highly advantageous.

In practice it is desirable that the nozzle core has a flange portion sealingly engaging the front end of the worm core portion, and, for this reason, it is not practical to use an axial adjustable nozzle core if an associated result is that this axial engagement is relieved. However, the engagement need not be relieved when the holding tube is combined with an inner lining tube, which projects in front of the nozzle core and is axially adjustable from a free rear end portion adjacent or outside the rear end of the holding tube. The nozzle core may then be suitable shaped as a rigid cone sealing rearwardly against the front end of the worm core portion and narrowing towards the extruder nozzle, while the distance between the extruder nozzle and the effective front end of the nozzle core will be variable with the position of the front end of the axially adjustable lining tube.

In the following the invention is described in more detail, by way of an example, with reference to the accompanying drawing.

DETAILED DESCRIPTION

Figure 1:
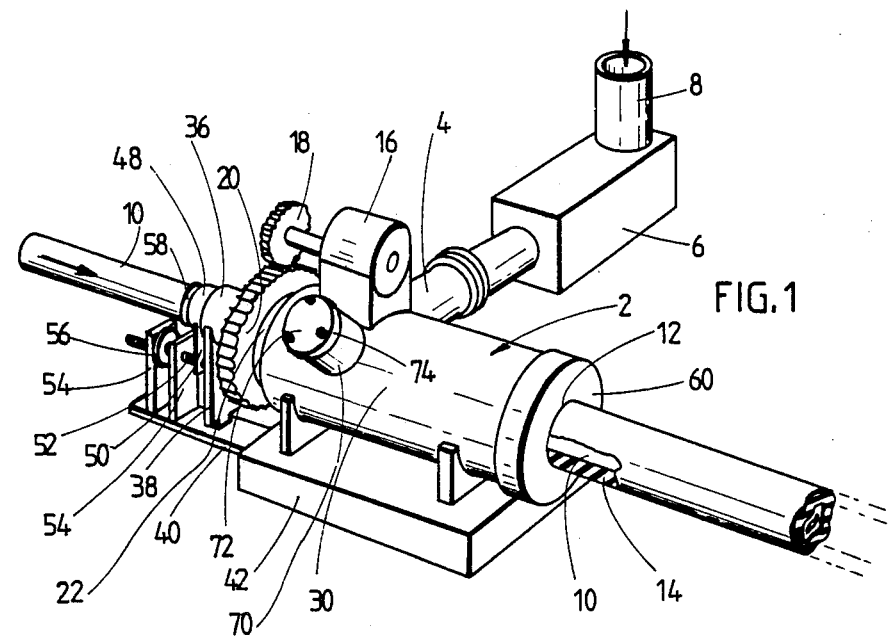
FIG. 1 is a perspective view of a crosshead extruder according to the invention.

The system shown in FIG. 1 comprises a crosshead extruder generally designated by the reference numeral 2 having a side inlet tube 4, which is connected to a feeding extruder 6 operable to supply an unvulcanized rubber mass received through an inlet 8 to the crosshead extruder 2 under a high pressure. The crosshead has a central passage for a cylindrical workpiece 10, which by the action of the extruded material, is drawn through the crosshead in direction of the arrow shown, whereby the workpiece 10 will leave the crosshead extruder 2 through a foremost extruder nozzle 12, now provided with a coating 14 of the rubber mass.

The crosshead is provided with an internal rotatable worm which is driven by a motor 16 having a driving pinion 18 cooperating with a larger pinion 20 on the rear end of the worm behind the rear end of the crosshead extruder 2.

Figure 2:
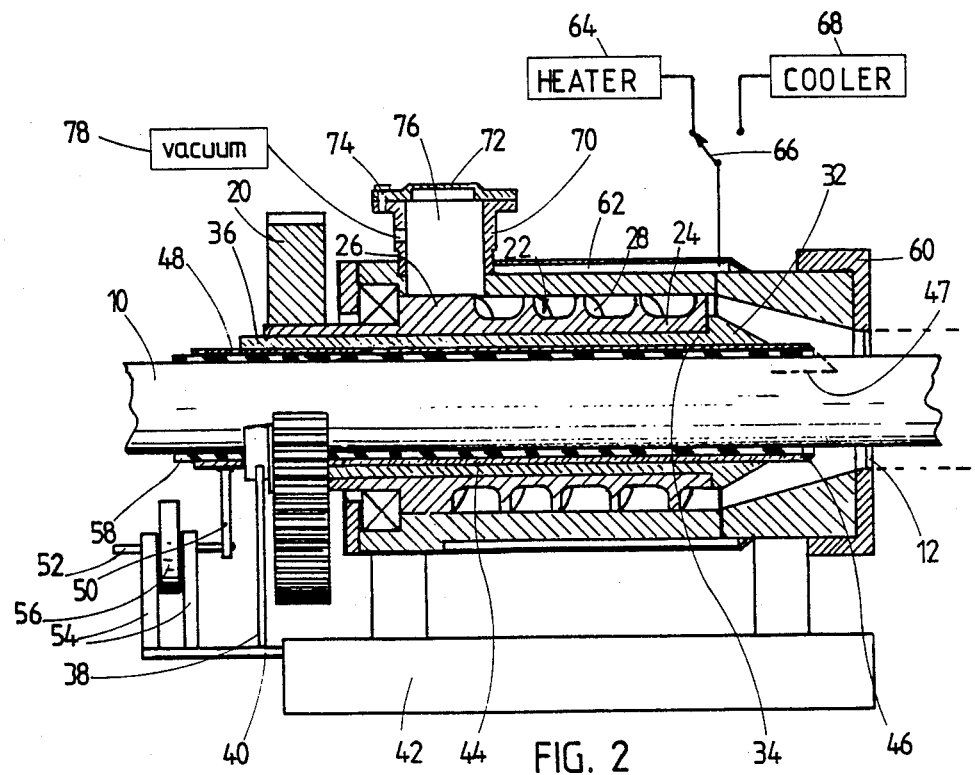
FIG. 2 is a sectional view of the crosshead extruder of FIG. 1.

The worm 22 as shown in FIG. 2, comprises a tubular worm core 24 projecting forwardly from a rear block portion 26 and provided with a single, double or multiple worm winding 28 cooperating with the inside of the cylindrical main housing 30 of the crosshead extruder 2. The cylindrical block portion 26 projects rearwardly beyond the rear end of the housing 30 and carries the pinion 20.

The front end of the worm 22 is spaced behind the extruder nozzle 12, and the worm core 24 is forwardly extended by a conical worm core head 32, also named a "nozzle core", which seals against the front end of the worm core 24 and converges towards the extruder nozzle 12. The nozzle core 32 is connected with the front end of a holding pipe 34, which projects rearwardly through the central passage of the worm back to behind the rear end of the worm 22, where the holding pipe has an exposed end portion 36. This portion has a fixed radial arm 38, which projects downwardly and is secured to a rear projection 40 on a carrier chassis 42 of the crosshead extruder 2, whereby the holding pipe 34 and therewith the nozzle core 32 is prevented from rotating.

Inside the holding pipe 34 is arranged a straight cylindrical pipe 44 having a front end 46 projecting in front of the nozzle core 32 or rather forming a front end thereof and having a rear end 48, which projects beyond the rear end 36 of the holding pipe 34 and is provided with a downwardly projecting radial arm 50 connected with an adjustment spindle 52. The latter is held and guided by two fixed brackets 54, between which an adjustment nut 56 is mounted on the spindle 52. With this arrangement the axial position of the inner pipe 44 may be adjusted by rotating the adjustment nut 56, whereby the position of the front end 46 of the inner pipe 44 is finely adjustable. This adjustability of the effective front end of the nozzle core is very important in practice, particularly when the crosshead extruder 2 is used for handling varying types of coating materials.

The workpieces 10 to be coated are conveyed and guided through the inner pipe 44, centered directly by the pipe 44 or by an innermost lining sleeve 58 made, for example, of rubber.

The extruder nozzle 12 is provided in an end cap 60 threaded onto the front end of the crosshead housing 30, and, of course, the crosshead extruder 2 comrpises several end caps 60 having different nozzle diameters for the production of coated products of different exterior diameters. Alternatively, different nozzle inserts may be provided for insertion in one or only a few different end caps 60.

Similarly, for adapting the extruder to workpieces of a wide range of diameters the apparatus may comprise a low number of inner pipes 44 having the same external diameter corresponding to the diameter of the central passage of the holding pipe 34, but having different inner diameters, each corresponding to respective outer diameters of a series of sleeves 58 having different inner diameters. The inner pipes and the sleeves are easy to exchange, as they can be retracted and inserted from behind, without the machine having to cleaned. In FIG. 2, the contour of the front end of a thicker inner pipe 44 is shown in dotted lines at 47. In a manner not shown, the machine may be provided with for example, hydraulically operated means for retracting and inserting the inner pipes 44.

In operation the rubber mass is forced into the inlet 4 from the extruder 6 and thus into the rear end portion of the worm winding 28, and the worm 22 is rotated by the motor 16 so as to convey the pressurized mass towards the extruder nozzle 12, the worm hereby discharing the mass successively all the way around the nozzle core 32,46. Thus, the material is "threaded" out into the space between the worm 22 and the nozzle 12, but since the nozzle core 32 is locked against rotation, the frictional engagement between the material and both the outer surface of the nozzle core 32,46 and the other rigid walls of the space will soon cause the material to stop rotating as it is forced further towards the nozzle 12. Therefore, the highly viscid material is brought to safely fill out the space all around the path of the workpiece 10 and also to be forced into contact with the workpiece 10 with a direction of movement more or less exactly coinciding with that of the workpiece (which is not rotated). A potential disadvantage of the rotating worm 22 with respect to the material being threaded onto the workpiece 10 is thereby eliminated. The workpiece is advanced by the drawing action of the moved material.

For the handling of rubber compounds and most other highly viscid masses it is advantageous or practically necessary to hold the material at an elevated temperature, and at least during a starting phase, therefore, it is desirable to heat the crosshead extruder 2. The housing of the crosshead extruder 2 is constructed with a ring cylindrical chamber 62, which is connectable with a heater unit 64 through a switch over valve 66 for preheating of the crosshead extruder 2. However, during the work the frictional heat developed inside the crosshead extruder 2 may effect a temperature increase which is not only sufficient in this respect, but in fact more than sufficient in that it may be too high, for example, by causing the rubber mass to initiate a vulcanization at some 90°-100° C. For enabling the crosshead extruder 2 to operate with a reasonably high capacity it may be necessary, to provide for active cooling of the crosshead extruder 2, and, in a preferred arrangement, the chamber 62 is also connectable through the valve 66 with a cooling unit 68 for effecting such cooling when necessary.

The nozzle core 32 should be adequately sealed against the front end of the worm 22, but it will be possible to provide for a suitable sealing even if the holding pipe 44 and therewith the nozzle core 32 is arranged in an axially adjustable manner, whereby the inner straight pipe 44 could be avoided.

The inner pipe 44 should not necessarily be held in a non-rotatable manner.

When the coating material is a rubber mass, the coated workpieces 10 normally proceeds further to a heating station in which a well controlled vulcanization is effected.

The housing of the crosshead extruder 2 is provided with a radially projecting cylindrical portion 70 which is closed by an outermost lid 72 secured by bolts 74, the interior space of this portion being designated 76. The space 76 communicates with the outside of the worm member 22 near the inlet end thereof, and it serves several purposes such as, for example an expansion chamber for the coating material in case the inlet rate thereof should temporarily supercede the rate of material outlet through the extruder nozzle 12; a security device in case the inlet rate supercedes the outlet rate more permanently, whereby the lid 72 will be blown off by breakage of the bolts 74 for protection of the remaining crosshead apparatus against damage by excessive internal overpressure; an inspection opening enabling visual inspection of the handled material when the lid 72 is removed; as an inlet for an infill material such as raw rubber usable for the cleaning out of a previously handled coating material from the worm and from the space next to the extruder nozzle, preparatory to the handling of a different coating material; and a chamber which is well suited to be connected to a vacuum source 78 for the extraction of air bubbles from the inlet material.

I claim:

1. An extruder crosshead for applying a coating of highly viscid coating material onto a cylindrical workpiece, the extruder crosshead comprising a cylindrical extruder housing having an extruder nozzle in a front wall portion thereof and having, adjacent a rear end thereof, a cross-oriented supply opening for enabling an introduction of the coating material, an internally provided conveyor worm rotated from the rear end of the housing and having a central passage for a through flow of elongated workpieces to be treated, a core portion of the worm adjacent a delivery end thereof being extended towards the extruder nozzle through a projecting tube element anchored against rotation together with the worm, a projecting tube element and nozzle core is anchored by being connected with a holding pipe which extends rearwardly through a central passage of the worm, closely inside an inner wall thereof and rearwardly beyond the rear end of the worm, where the holding plate is anchored to the extruder housing in a non-rotatable manner, wherein the nozzle core includes a combination of an outer tube head provided on the foremost end of the holding pipe so as to seal against a front end of the core tube of the worm and to project forwardly therefrom, preferably in a forwardly converging manner, and a further forwardly projecting front end portion of an inner pipe mounted inside the holding pipe and being connected, outside a rear end of the holding pipe, with means for adjusting the axial location of the inner pipe, and wherein the inner pipe is rearwardly retractable from the holding pipe.

2. A crosshead according to claim 1, wherein the nozzle core includes a foremost straight cylindrical or conical end portion of the holding pipe, said holding pipe being mounted and anchored in an axially displaceable manner.

3. A crosshead according to claim 1, further comprising different inner pipes fitting in a central passage of the holding pipe, but having different interior diameters, and, for each, a small number of lining tubes, preferably made of rubber, fitting inside the respective inner pipes, but having different internal diameters.

4. A crosshead according to claim 1, wherein the coating includes an unvulcanized rubber mass.

* * * * *